United States Patent
Douglass, III

(10) Patent No.: US 10,428,978 B2
(45) Date of Patent: Oct. 1, 2019

(54) WEBLESS CORRUGATED DUAL WALL FOUNDATION DRAIN AND RELATED METHOD

(71) Applicant: Prinsco, Inc., Willmar, MN (US)

(72) Inventor: Carl Raymond Douglass, III, Spicer, MN (US)

(73) Assignee: Prinsco, Inc.

( * ) Notice: Subject to any disclaimer, the term of this patent is extended or adjusted under 35 U.S.C. 154(b) by 197 days.

(21) Appl. No.: 15/415,657

(22) Filed: Jan. 25, 2017

(65) Prior Publication Data

US 2017/0219132 A1    Aug. 3, 2017

Related U.S. Application Data

(60) Provisional application No. 62/288,502, filed on Jan. 29, 2016.

(51) Int. Cl.
| | |
|---|---|
| *F16L 9/133* | (2006.01) |
| *B29C 48/30* | (2019.01) |
| *B29C 48/153* | (2019.01) |
| *B29C 48/34* | (2019.01) |
| *E02D 31/02* | (2006.01) |

(Continued)

(52) U.S. Cl.
CPC ............ *F16L 9/133* (2013.01); *B29C 48/153* (2019.02); *B29C 48/30* (2019.02); *B29C 48/303* (2019.02); *B29C 48/34* (2019.02); *B29C 48/0022* (2019.02); *B29C 48/21* (2019.02);

(Continued)

(58) Field of Classification Search
CPC . F16L 9/003; F16L 3/006; F16L 9/133; F16L 11/15; F16L 23/14; F16L 25/0009; F16L 51/021; B29C 47/023; E02D 31/02
See application file for complete search history.

(56) References Cited

U.S. PATENT DOCUMENTS

| | | |
|---|---|---|
| D41,811 S | 9/1911 | McKeown et al. |
| 3,538,209 A | 11/1970 | Hegler |

(Continued)

FOREIGN PATENT DOCUMENTS

| | | | | |
|---|---|---|---|---|
| CN | 202868102 U | * | 4/2013 | |
| DE | 29905191 U1 | * | 8/2000 | ............ E02D 31/02 |

(Continued)

OTHER PUBLICATIONS

Saint-Gobain website; history main page: http://www.saint-gobain-northamerica.com/company/saint-gobain-north-america/history Found Dec. 7, 2016, Copyright 2014-2016.

(Continued)

*Primary Examiner* — Craig M Schneider
*Assistant Examiner* — David R Deal
(74) *Attorney, Agent, or Firm* — Schroeder & Siegfried, P.A.

(57) ABSTRACT

A webless corrugated dual wall foundation drain which is constructed as a hollow rectangular tubular member with an inner corrugated wall formed of HDPE and an integral outer smooth wall formed of the same material. The outer smooth wall of the foundation drain is attached to and integrally formed with the corrugations of the inner corrugated wall through a coextrusion process, thereby significantly enhancing the vertical beam stiffness of the foundation drain and eliminating the need for an internal supporting web.

14 Claims, 18 Drawing Sheets

(51) Int. Cl.
 B29K 23/00 (2006.01)
 B29C 49/00 (2006.01)
 B29C 48/00 (2019.01)
 B29C 48/21 (2019.01)
 B29C 48/90 (2019.01)

(52) U.S. Cl.
 CPC ........ *B29C 48/905* (2019.02); *B29C 49/0021* (2013.01); *B29K 2023/065* (2013.01); *E02D 31/02* (2013.01)

(56) References Cited

U.S. PATENT DOCUMENTS

| | | |
|---|---|---|
| D219,877 S | 2/1971 | Thompson |
| 3,578,777 A | 5/1971 | DeGain |
| 3,677,676 A | 7/1972 | Hegler |
| D234,516 S | 3/1975 | Sixt |
| 3,869,235 A | 3/1975 | Moore |
| 3,958,425 A | 5/1976 | Maroschak |
| 3,976,578 A | 8/1976 | Beane |
| 4,037,626 A | 7/1977 | Roberts, Jr. |
| 4,721,408 A | 1/1988 | Hewlett |
| 4,756,339 A | 7/1988 | Buluschek |
| D299,162 S | 12/1988 | Fredblad |
| 4,950,446 A | 8/1990 | Kinumoto et al. |
| 5,087,151 A | 2/1992 | DiTullio |
| D326,140 S | 5/1992 | Dekel |
| 5,120,162 A | 6/1992 | Parker |
| 5,224,799 A | 7/1993 | Parker |
| D341,654 S | 11/1993 | Wortham |
| 5,446,092 A | 11/1995 | Semensz et al. |
| 5,474,400 A | 12/1995 | Kliefoth et al. |
| D397,193 S | 8/1998 | Boyle et al. |
| 5,829,483 A | 11/1998 | Tukahara |
| 5,950,369 A | 9/1999 | Amatsutsu |
| 5,976,298 A | 11/1999 | Hegler et al. |
| D423,090 S | 4/2000 | Barbosa |
| 6,223,777 B1 | 5/2001 | Smith et al. |
| D443,344 S | 6/2001 | Evans |
| 6,263,157 B1 | 7/2001 | De'Longhi |
| D447,545 S | 9/2001 | Ng |
| 6,461,078 B1 | 10/2002 | Presby |
| 6,573,451 B2 | 6/2003 | Komiya |
| D498,825 S | 11/2004 | Fu |
| 6,854,925 B2 | 2/2005 | DiTullio |
| 6,872,888 B2 | 3/2005 | Santelli |
| 6,968,864 B2 | 11/2005 | Miyamoto |
| D514,670 S | 2/2006 | Handley |
| D515,183 S | 2/2006 | Nigro |
| 7,017,614 B2 | 3/2006 | Handley |
| D530,412 S | 10/2006 | Aydin |
| 7,156,128 B1 | 1/2007 | Kanao |
| 7,174,953 B2 | 2/2007 | Chiba |
| 7,314,066 B2 | 1/2008 | Castillo et al. |
| 7,407,197 B2 | 8/2008 | Gronquist |
| 7,451,784 B2 | 11/2008 | Goddard |
| 7,484,535 B2 | 2/2009 | Goddard |
| 7,637,691 B1 | 12/2009 | DiTullio |
| D624,166 S | 9/2010 | Zanolin et al. |
| 7,866,097 B1 | 1/2011 | Moyher |
| 7,886,774 B1 | 2/2011 | Popp |
| 8,114,324 B2 | 2/2012 | Sutton et al. |
| D666,701 S | 9/2012 | Smith |
| D684,245 S | 6/2013 | Dong |
| 8,579,624 B2 | 11/2013 | Sutton et al. |
| D698,014 S | 1/2014 | Dong |
| 8,627,615 B2 | 1/2014 | Moyher |
| 8,689,837 B1 | 4/2014 | Smith |
| 8,733,405 B2 | 5/2014 | Goddard et al. |
| 8,820,800 B2 | 9/2014 | Sutton et al. |
| 8,820,801 B2 | 9/2014 | Sutton et al. |
| D724,704 S | 3/2015 | Douglass, III et al. |
| 9,341,289 B1 | 5/2016 | Maroschak |
| D772,382 S | 11/2016 | Meert |
| 2003/0178083 A1 | 9/2003 | McCaughtry |
| 2005/0155660 A1 | 7/2005 | Handley |
| 2006/0248852 A1* | 11/2006 | Calle ............. E02D 27/42 52/750 |
| 2009/0000682 A1 | 1/2009 | Kisu et al. |
| 2012/0018023 A1 | 1/2012 | Diels |
| 2013/0118631 A1 | 5/2013 | Itagaki |
| 2016/0018027 A1 | 1/2016 | Douglass, III |

FOREIGN PATENT DOCUMENTS

| | | | |
|---|---|---|---|
| GB | 376111 | 7/1932 | |
| WO | WO2010/086819 A1 | 8/2010 | |
| WO | WO 2010088773 A1 * | 8/2010 | ............ F16L 11/121 |
| WO | WO2015023618 A2 | 2/2015 | |

OTHER PUBLICATIONS

CertainTeed Saint-Gobain; CertainTeed FORM-A-DRAIN™ Foundations; Code No. 40-95-26A, Copyright May 2010 CertainTeed Corporation, Printed in U.S.A.

Canadian Patent and Trademark Office, "Non-Final Office Action", issued in connection with Canadian Patent Application No. 2,956,274, dated Mar. 5, 2018.

* cited by examiner

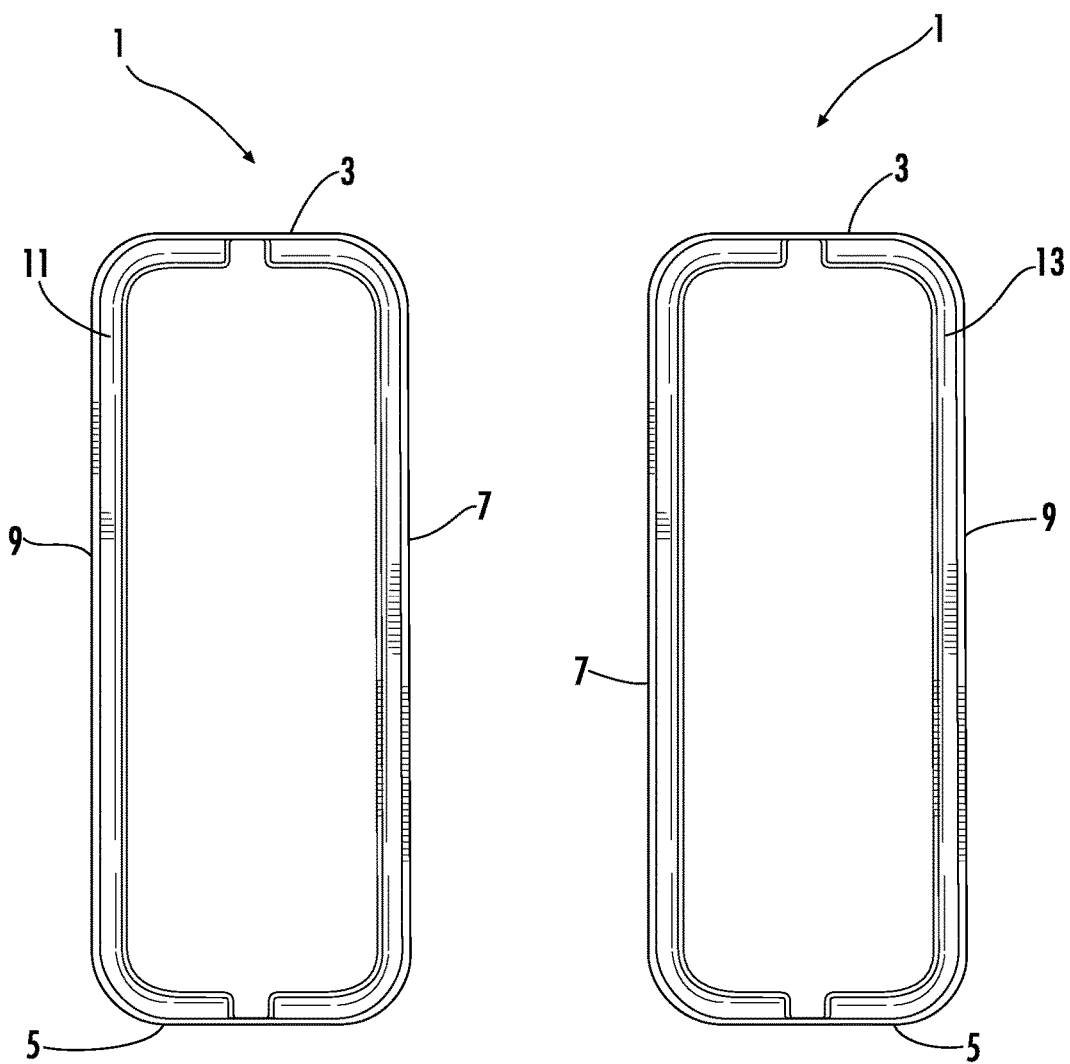

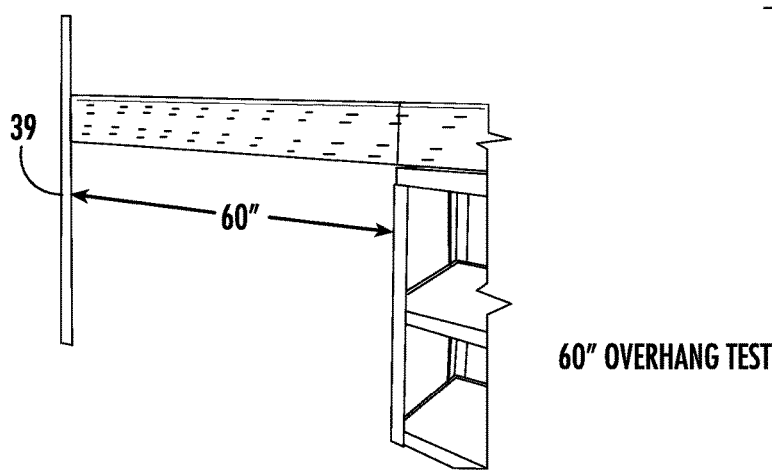
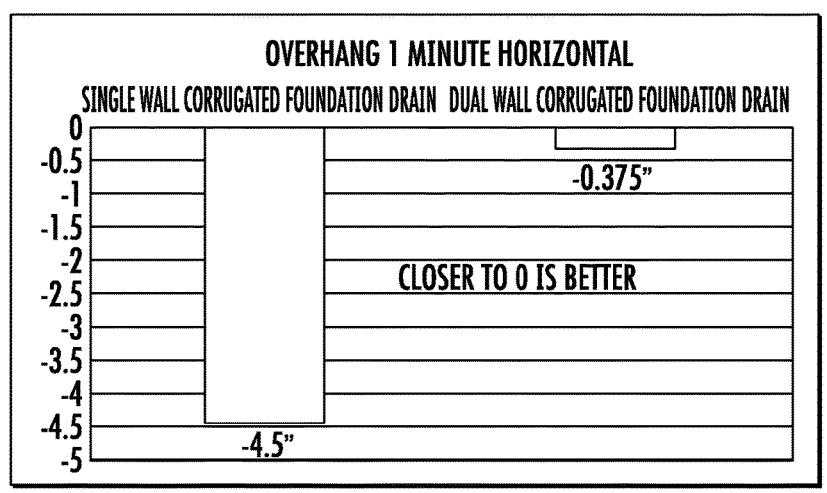
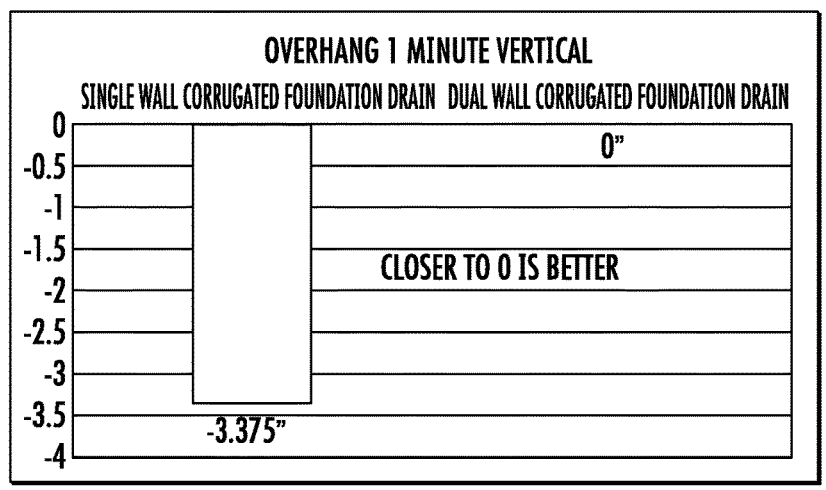
FIG. 16

WEBLESS CORRUGATED DUAL WALL FOUNDATION DRAIN AND RELATED METHOD

CROSS REFERENCE TO RELATED APPLICATIONS

This application is a nonprovisional application which claims the benefit of U.S. Provisional Application Ser. No. 62/288,502, filed on Jan. 29, 2016, the contents of which is hereby incorporated by reference herein in its entirety.

FIELD OF INVENTION

The present invention relates generally to a corrugated foundation drain, and more particularly to a foundation drain and method of forming same which is generally polygonal (preferably rectangular) in shape and has a dual wall construction, including a webless corrugated tubular inner wall structure over which a generally smooth outer wall structure is secured.

BACKGROUND

The statements in this section merely provide background information related to the present disclosure and may not constitute prior art.

Most residential and light-commercial buildings have concrete footer and foundations which are cast in place on site before the construction of the building begins. The purpose of the footer is to provide a solid base for the building to prevent structural movement and other damage. These cast-in-place concrete footers are traditionally poured in place with the use of wood forms which are typically 2'×8' boards. As a practical matter, the conventional wood 2'×8' boards provide excellent vertical beam stiffness to facilitate proper leveling of the poured footings, and the boards are also relatively resistant to heavy impact during use.

Once the footer is poured and the concrete sets up, the lumber forms are removed and drainage pipe is installed. The drainage pipe is a critical component of the footer system because excessive water can lead to structural failure. In addition to water management, the pipe also serves to ensure water is evacuated from the area. The process of installing the lumber forms, removing the lumber forms after the concrete is set, and then installing the drainage system is time intensive for the contractor and has multiple steps resulting in safety risks and potential for mistakes to occur.

There are a few existing manufactured alternative solutions to the traditional use of lumber forms for the construction of building footers. One product utilizes an extruded polyvinyl chloride (PVC) rectangular profile pipe that serves as the concrete form and is left in place to provide foundation drainage once the building is complete. The rectangular PVC pipe greatly accelerates and simplifies the construction process and provides a great deal of beam stiffness similar to 2'×8' lumber form. The deficiency with the rectangular PVC pipe, however, is that it is very brittle and sensitive to handling, especially in cold temperature climates. The poor impact performance limits the product's market acceptance.

A second product solution on the market is a rectangular corrugated high-density polyethylene (HDPE) pipe that serves the dual purpose for the footer form and is designed to remain in place long term to provide foundation drainage. The benefit of the rectangular corrugated HDPE pipe is the high level of impact resistance performance due to the more flexible nature of the material. The conventional rectangular corrugated HDPE pipe, however, is deficient in vertical beam stiffness, as it is significantly more flexible than the rectangular PVC pipe and the 2'×8' lumber form. Consequently, vertical sagging can occur over the length of the pipe, thus causing the formation of uneven footings.

With traditional HDPE foundation drain pipe (as well as PVC pipe), it is common to form the pipe with an inner web to add lateral strength and resist inward deflection or distortion of the pipe. However, such internal webbing is not constructed to prevent the HDPE pipe from exhibiting undesirable sagging due to inadequate vertical beam stiffness of the product.

For the foregoing reasons, there is a significant need in the industry for a foundation drain which includes the benefits of the impact resistant HDPE pipe, yet exhibits the longitudinal beam stiffness akin to PVC pipe. It is with these goals in mind that the present invention has been developed.

SUMMARY

What is desired therefore, is a foundation drain that includes the advantageous benefits of impact resistance provided by the flexible nature of HDPE pipe, yet exhibits the longitudinal beam stiffness akin to the PVC pipe and conventional lumber forms.

It is further desired to provide a foundation drain that is constructed to minimize any damage during use caused from the impact of relatively heavy objects, such as rocks, etc., yet has sufficient beam stiffness to prevent undesirable vertical sagging of the product longitudinally.

Through testing and development, a solution has been identified which resolves the deficiencies caused by the flexible nature of the HDPE pipe. The solution basically involves extruding a smooth HDPE outer wall over the exterior of the rectangular corrugated pipe to form a dual wall smooth exterior pipe. The smooth exterior layer bridges the corrugations, thereby significantly increasing the beam stiffness of the drain pipe so as to prevent vertical deflection thereof and avoid an accordion-like distortion of the pipe corrugations. The design intent is to have a smooth HDPE shell extruded on and affixed to the exterior of the corrugated pipe; however, it is anticipated that the outer layer may exhibit some slight waviness (i.e., slight sag between corrugations) due to the manufacturing process.

As an added benefit of the outer smooth wall, the center web common to traditional plastic foundation drain forms may be eliminated. Through the extrusion process, the outer smooth wall is affixed about the perimeter of the rectangular pipe to the exterior of each inner wall corrugation. As such, the outer smooth wall not only greatly increases the vertical beam stiffness of the product, but also greatly strengthens the product as a whole so as to resist lateral or inward deflection of the pipe. Consequently, the need for the inner transverse web typically associated with a conventional HDPE or PVC foundation drain forms has been eliminated.

Further areas of applicability will become apparent from the detailed description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a perspective view showing the setting of conventional prior art HDPE foundation drainage forms and the vertical deflection of the forms caused by inadequate beam stiffness;

FIG. 2 in another perspective view showing the downward sagging effect of conventional prior art HDPE foundation drainage forms due to inadequate beam stiffness of the product;

FIG. 5 is a front devotional view of the webless corrugated dual wall foundation drain depicted in FIG. 4;

FIG. 6 is a rear elevational view of the webless corrugated dual wall foundation drain depicted in FIG. 4;

FIG. 13A is a cross-sectional view of the top and bottom portions of the section of dual wall foundation drain pipe shown in FIG. 13, disclosing the relative wall thickness of the foundation drain pipe in this area;

FIG. 13B is a cross-sectional view of the side portions of the section of dual wall foundation drain pipe shown in FIG. 13, disclosing the relative wall thickness of the foundation drain pipe in this area;

FIG. 16 is a diagrammatic view showing the setup for a 60 inch overhang load test used for foundation drain, with comparative vertical and horizontal test results of webless corrugated dual wall foundation drain versus conventional single wall corrugated foundation drain;

Figure 22:
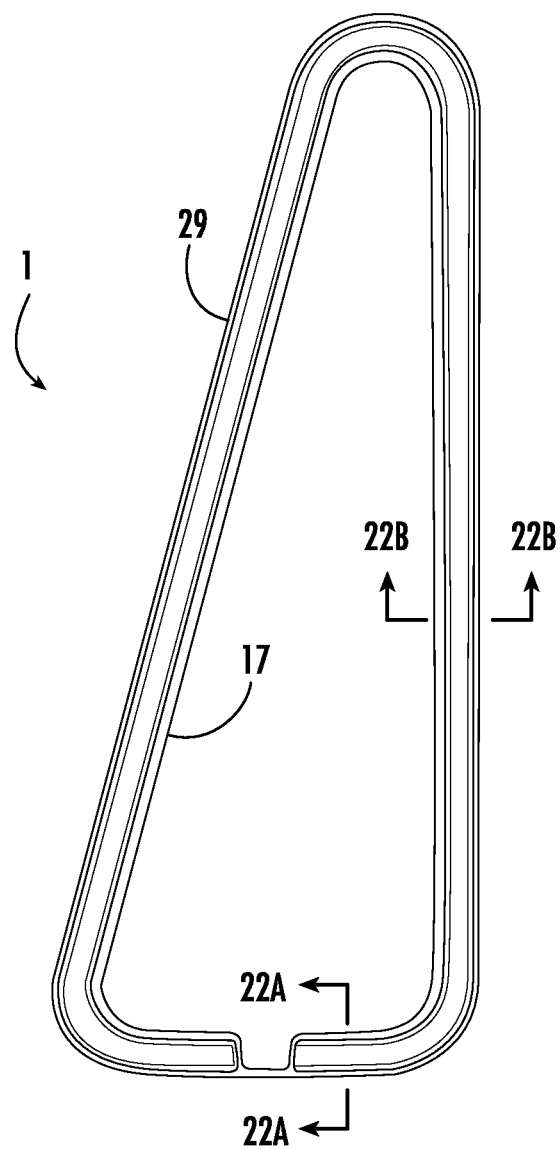
FIG. 22 is a front elevational view of another embodiment of a webless corrugated dual wall foundation drain pipe having a generally triangular cross-sectional configuration.
Figure 22A:
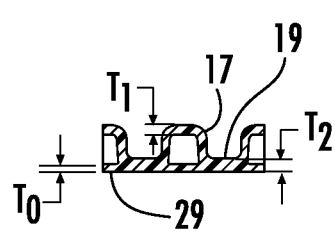
Figure 22B:
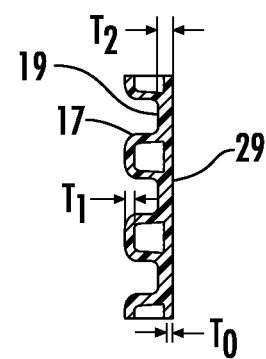

FIG. 22A is a cross-sectional view of the top and bottom portions of the section of dual wall foundation drain pipe shown in FIG. 22, disclosing the relative wall thickness of the foundation drain pipe in this area; and FIG. 22B is a cross-sectional view of the side portions of the section of dual wall foundation drain pipe shown in FIG. 22, disclosing the relative wall thickness of the foundation drain pipe in this area.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
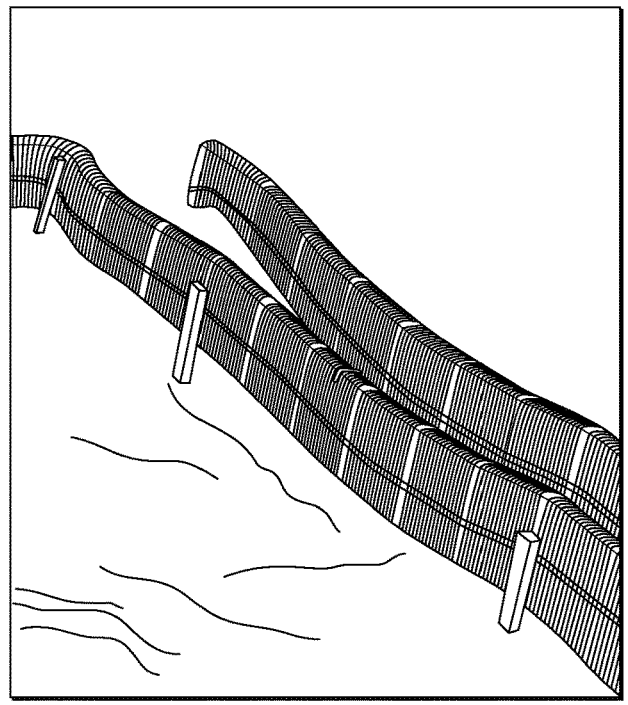
Figure 2:
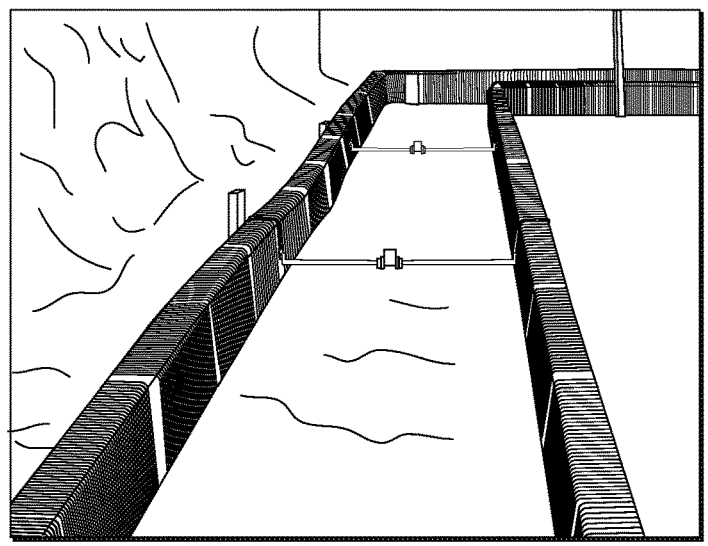

As pointed out previously, the conventional method of constructing footings using conventional lumber forms, and separately installing the drainage system used in connection therewith, is extremely time consuming and laborious. Although improvements in the industry have been made through the use of rectangular shaped foundation drainage forms constructed of HDPE, such forms exhibit deficiencies in strength, particularly in vertical beam strength. As shown in FIGS. 1 and 2, due to the flexibility of the conventional HDPE drainage form and consequent poor vertical beam stiffness, the product tends to sag along its length between positions where the product is staked to the ground. This leads to uneven leveling of the poured concrete, and therefore requires extra time of contractors for handling and installation in footer applications.

Figure 3:
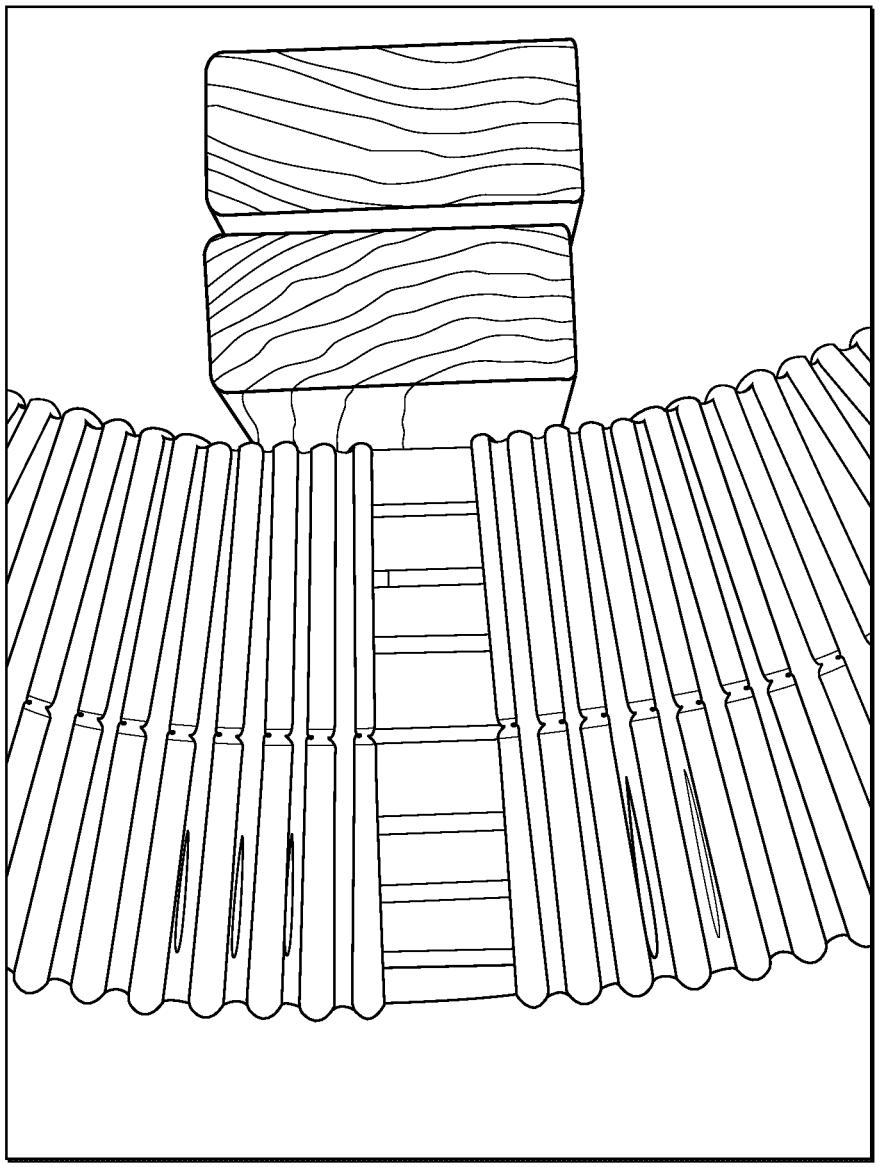
FIG. 3 is a side elevational view showing the effect of vertical deflection on a section of conventional HDPE foundation drain pipe and the consequent damage that can be caused thereby.

FIG. 3 further exemplifies the deficiencies of conventional HDPE foundation drain pipe. FIG. 3 shows the results of an actual vertical beam stiffness test being conducted on a section of conventional HDPE foundation drain pipe to illustrate the potential defects that can occur as a result of inadequate vertical beam strength. As shown, the corrugations exhibit an accordion-like distortion, being squeezed together along the intrados surface of the curved section of pipe, and being stretched or widened along the extrados surface of the pipe. Such deflection is caused by inadequate beam stiffness, and in addition to causing additional time and expense required for installation, can lead to failure of the pipe itself.

In order to resolve these noted deficiencies, in accordance with the present invention, a smooth HDPE outer wall is extruded over the exterior of a generally rectangular shaped corrugated foundation drain pipe, thereby forming a dual wall smooth exterior foundation drain pipe. The smooth exterior layer bridges the corrugations of the inner wall, thereby significantly increasing the beam stiffness, and preventing vertical deflection and the accordion-like distortion of the pipe corrugations caused thereby. Although the discussion herein contemplates and focuses primarily on corrugated foundation drain having a generally rectangular cross-sectional configuration, it will be appreciated that the same principles are equally applicable to corrugated foundation drain having other polygonal cross-sectional configurations, such as trapezoidal (FIG. 21), triangular (FIG. 22), and other polygonal cross-section configurations.

More specifically, with reference to FIGS. 4-13, it is seen that in the preferred embodiment, similar to the prior art system of FIGS. 1 and 2, each of the drain segments 1 are constructed of a relatively flexible plastic material, preferably HDPE. It will be appreciated, however, that other suitably flexible plastic materials could be used without departing from the broad aspects of the present invention. Each drain segment 1 constitutes a generally rectangular tubular member which is preferably generally straight along its longitudinal axis, with dimensions of approximately 6" in height, 2" in width and approximately 10' in length. Drain segment 1 has a top 3, a bottom 5, sides 7 and 9 respectively, and ends 11 and 13 respectively. Side 7 may have a plurality of holes or slots 15 formed there through to allow seepage of ground water into the drain as well as a path for accumulated radon gas the escape. Side 9 can also have a plurality of holes or slots 15 formed there through, although it is only deemed necessary for such slots to be formed in one side of the drain segment 1.

Figure 11:
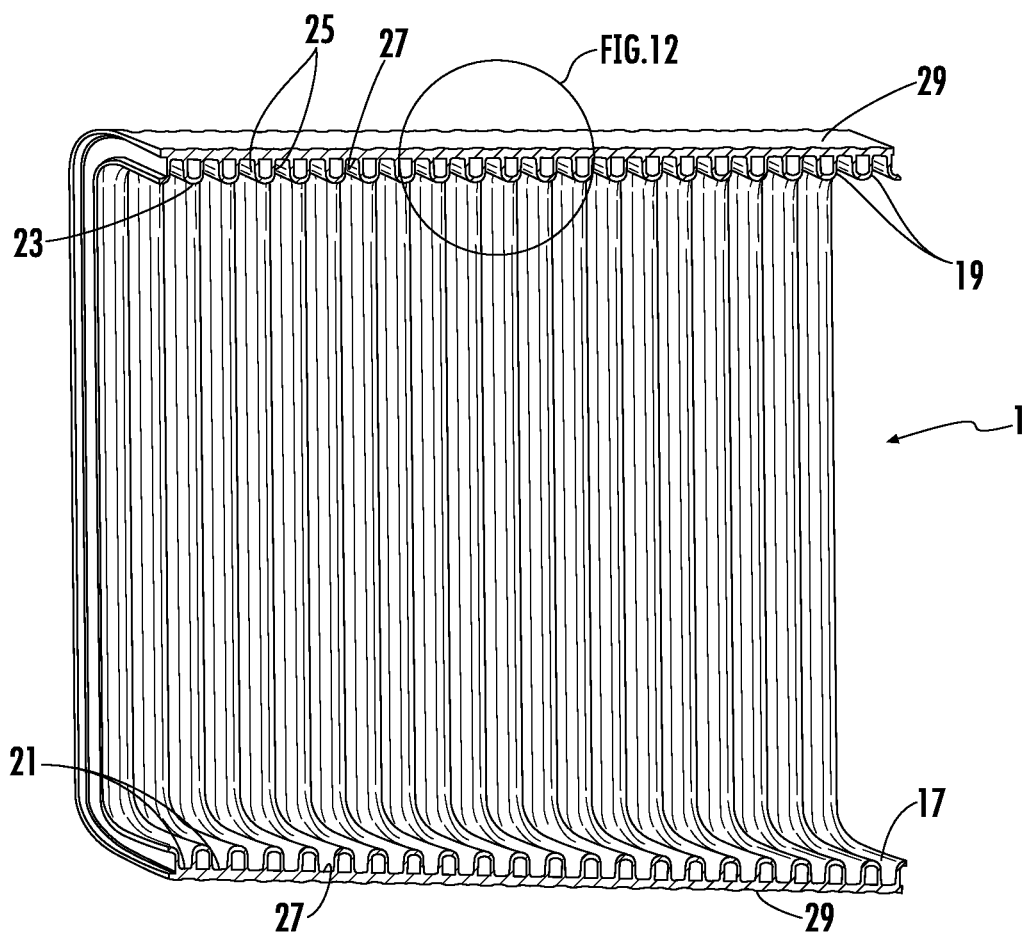
FIG. 11 is a vertical cross-sectional view of the webless corrugated dual wall foundation drain depicted in FIG. 4, showing the dual wall construction thereof.
Figure 12:
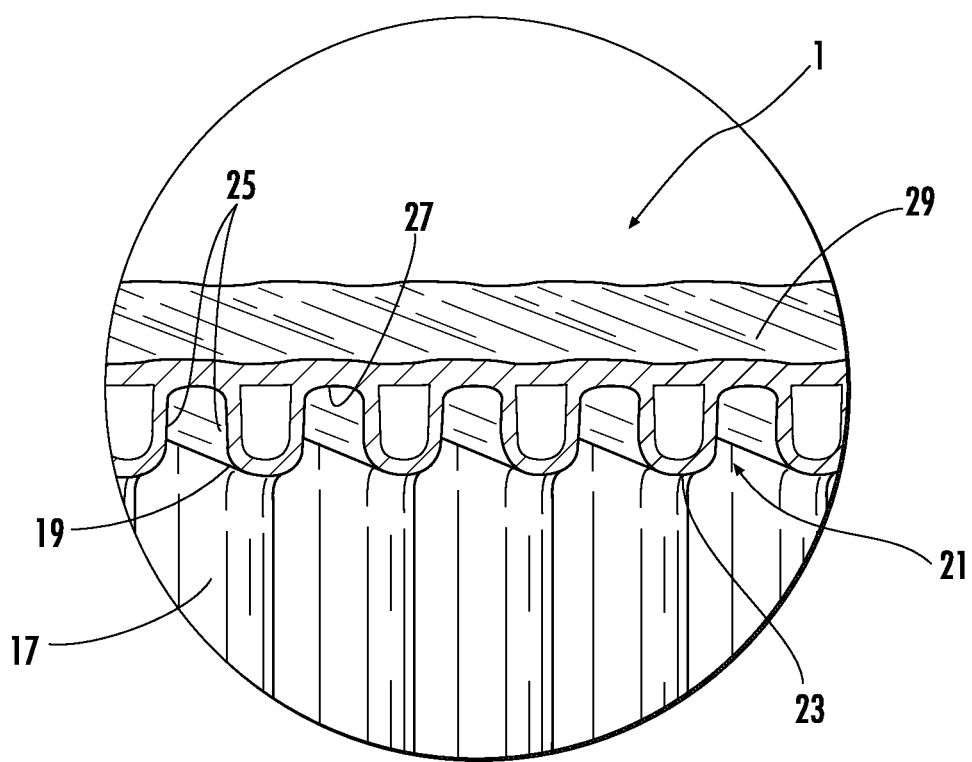
FIG. 12 is a blown up view of a portion of the cross-sectional view shown in FIG. 11, showing the detail of the inner corrugated wall and smooth exterior wall integrally formed therewith.

As shown best in FIGS. 11 and 12, each drain segment 1 is therefore comprised of a dual wall section of pipe which has an inner generally rectangular shaped corrugated tubular wall 17 formed preferably of HDPE. The inner corrugated wall 17 is defined by spaced apart successive circumferentially extending inward protruding corrugations 19 with circumferentially extending valley-defining portions 21 deposed therebetween. Each successive corrugation 19 has an inward facing crest portion 23 with annular sidewalls 25 extending radially outward therefrom. The sidewalls 25 of each corrugation 19 interconnect with and define the root 27 of each adjacent valley-defining portion 21 of the inner corrugated wall 17.

The exterior of each drain segment 1 is then defined by an integrally formed outer smooth wall 29 which is also formed preferably of HDPE, and which extends circumferentially around the entire inner rectangular shaped corrugated wall 17. The outer wall 29 is attached to and integrally formed with the root 27 of each of the successive valley-defining portions 21 of the inner corrugated wall 17 through a coextrusion process which will be described in more detail hereafter.

Figure 13:
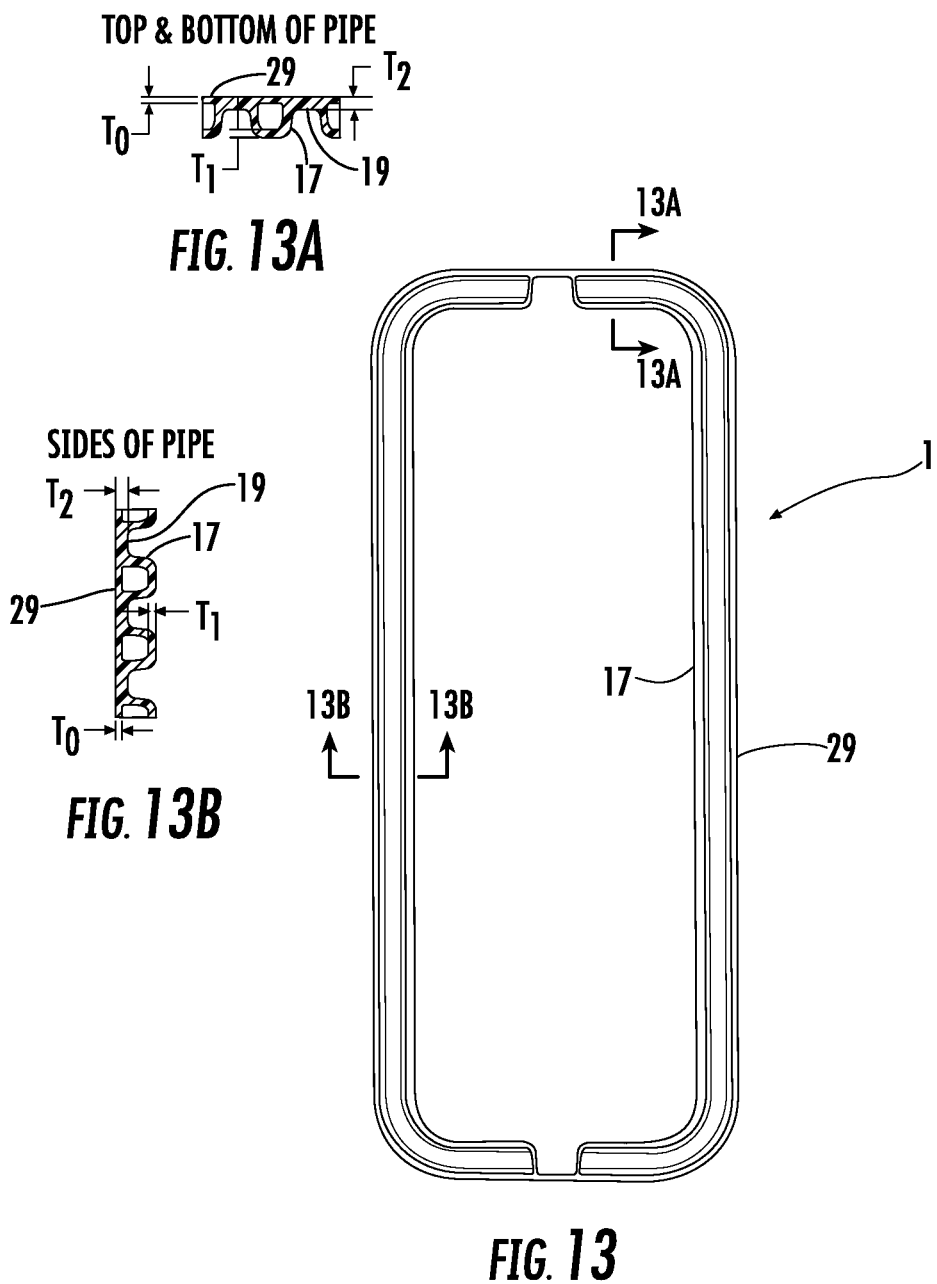
FIG. 13 is a front elevational view of an embodiment of a webless generally rectangular dual wall foundation drain pipe with associated cross sections showing the relative thickness of the outer smooth wall to the inner corrugated wall adjacent the top and bottom of the pipe, and adjacent the sides of the pipe.

With reference to FIG. 13, a representative drawing is shown of one embodiment of the present invention having a rectangular cross-sectional configuration, wherein it can be seen from associated FIGS. 13A and 13B that the thickness $T_0$ of the outer wall 29 on all sides of drain segment 1 is less than that of the thickness $T_1$ of inner wall 17. As further shown in FIGS. 13A and 13B, with the above configuration, the combined inner and outer wall thickness at point $T_2$ bridging the root section 27 of the valley-defining portion 19 between adjacent inner wall corrugations 19 is thicker than the wall segments at either points $T_0$ or $T_1$. Due to the manufacturing process, the relative thickness of $T_0$ to $T_1$ can vary slightly between the top/bottom of drain segment 1 and the sides thereof. Generally speaking, however, it has been found that a thickness $T_0$ which is on the order of about 10-45% of the thickness $T_1$ yields a significant increase in beam strength and pipe performance over conventional rectangular single wall corrugated foundation drainage pipe.

Figure 14:
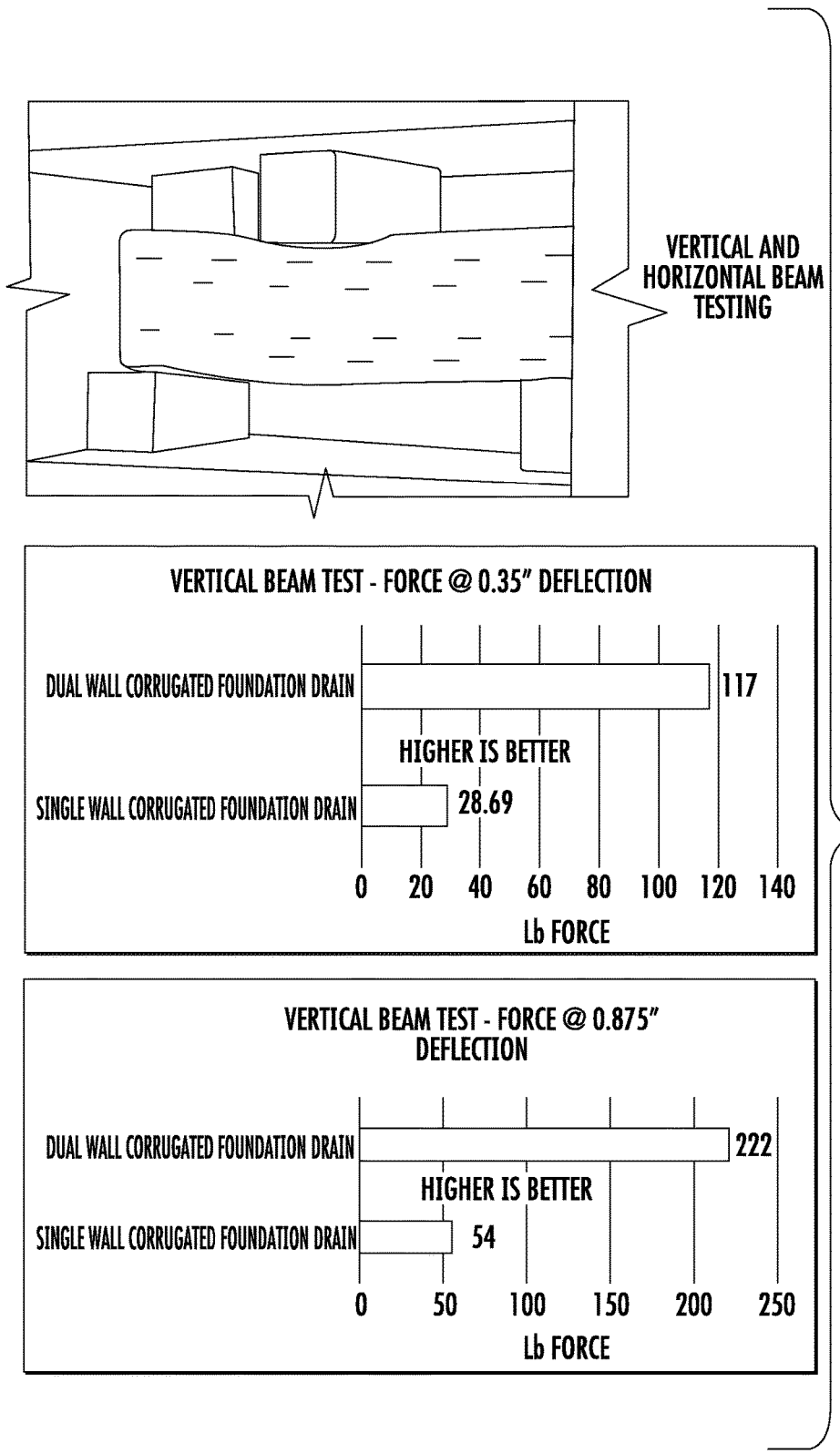
FIG. 14 is a diagrammatic view showing the setup for a vertical and horizontal beam test used for foundation drain, with comparative "vertical" beam test results of webless corrugated dual wall foundation drain versus conventional single wall corrugated foundation drain.
Figure 15:
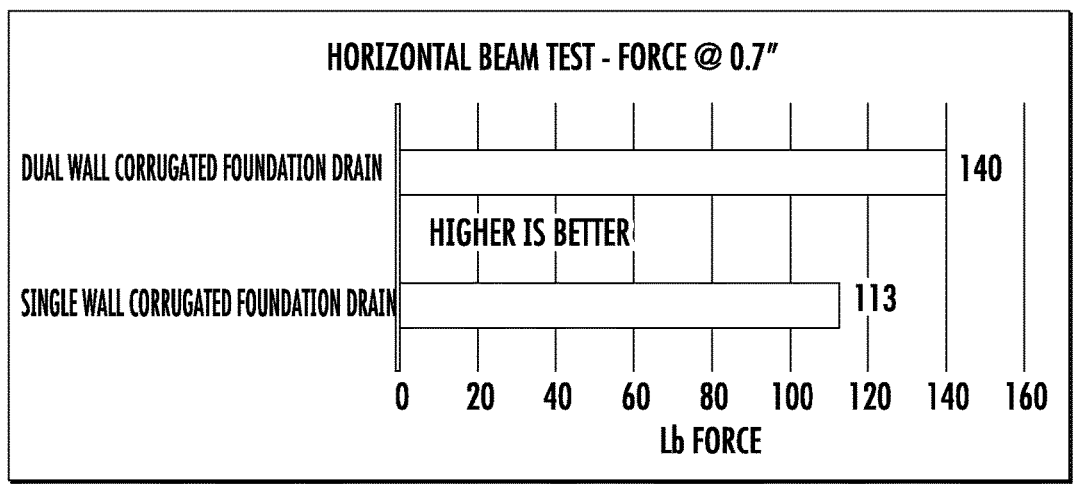
FIG. 15 is a diagrammatic view showing the comparative "horizontal" beam test results of webless corrugated dual wall foundation drain versus conventional single wall corrugated foundation drain from a similar test illustrated in FIG. 14.

The foregoing is best illustrated with reference to FIGS. 14-16, wherein comparative test results are displayed as to the vertical and horizontal beam strength between a segment rectangular HDPE dual wall foundation drainage pipe 1 constructed in accordance with the foregoing parameters, and a segment of conventional HDPE single wall corrugated foundation drainage pipe constructed of similar shape, size and material density. In FIGS. 14-15, each segment of foundation drainage pipe is subjected to enough force to cause deflection of the pipe sample a certain distance either vertically or horizontally. As shown in the diagram of FIG. 14, this test involves spanning a section of pipe between a pair of spaced blocks and applying a load against the middle of the pipe to cause the pipe to deflect.

FIG. 14 shows a graph of the results of the vertical beam test at a deflection of both 0.35 inches and 0.875 inches. In the graphs of this figure, it can be seen that the rectangular dual wall foundation drain 1 constructed according to the present invention outperformed the conventional single wall corrugated foundation drain by over 400%. In each test conducted, the segment of rectangular dual wall foundation drainage pipe 1 required over four (4) times as a much force to deflect the pipe to the same degree as a segment of conventional single wall corrugated foundation drainage pipe constructed of similar shape, size and material density. FIG. 15, on the other hand, shows the results of the horizontal beam test at a deflection of 0.7 inches. As seen in this test, the rectangular dual wall foundation drainage pipe outperforms the single wall corrugated foundation drain by about 20% (140 lbs. vs. 113 lbs.).

FIG. 16 shows the results of an overhang test, which measures (via stick ruler 39) the deflection of the respective pipe samples (both horizontal and vertical orientation) under their own weight with a 60.0 inch overhang. This test tends to provide an even more practical measure of the manner in which the foundation drainage pipe will function in the field, since it is subject mainly to its own weight. The dual wall foundation drainage pipe 1, which includes an additional outer wall 29, is undoubtedly heavier than conventional single walled corrugated pipe constructed of like shape, size and materials. Nevertheless, the results of FIG. 16 show that, after one minute overhang time, the conventional HDPE single wall corrugated foundation drainage pipe deflected over ten (10) times as much (both horizontally and vertically) as the rectangular HDPE dual wall foundation drainage pipe 1. In fact, the deflection of the rectangular HDPE dual wall foundation drainage pipe 1 vertically (lower graph) was undetectable, whereas the vertical deflection of the conventional HDPE single wall corrugated foundation drainage pipe was −3.375 inches.

By integrally forming an outer smooth wall 29 to the inner corrugated wall 17 of each rectangular drain segment 1, the smooth exterior layer bridges the inner corrugations 19 and significantly increases the beam stiffness over the length of the drain segment 1. By so doing, vertical sagging or deflection and the consequent accordion-like distortion of the pipe corrugations is eliminated, thereby ensuring that the drain segments remain level during installation. Comparing the results in FIGS. 14-16 to that of the conventional HDPE drain pipe shown in FIG. 3, the significant increase in beam stiffness and structural integrity as a whole is plainly evident.

Figure 4:
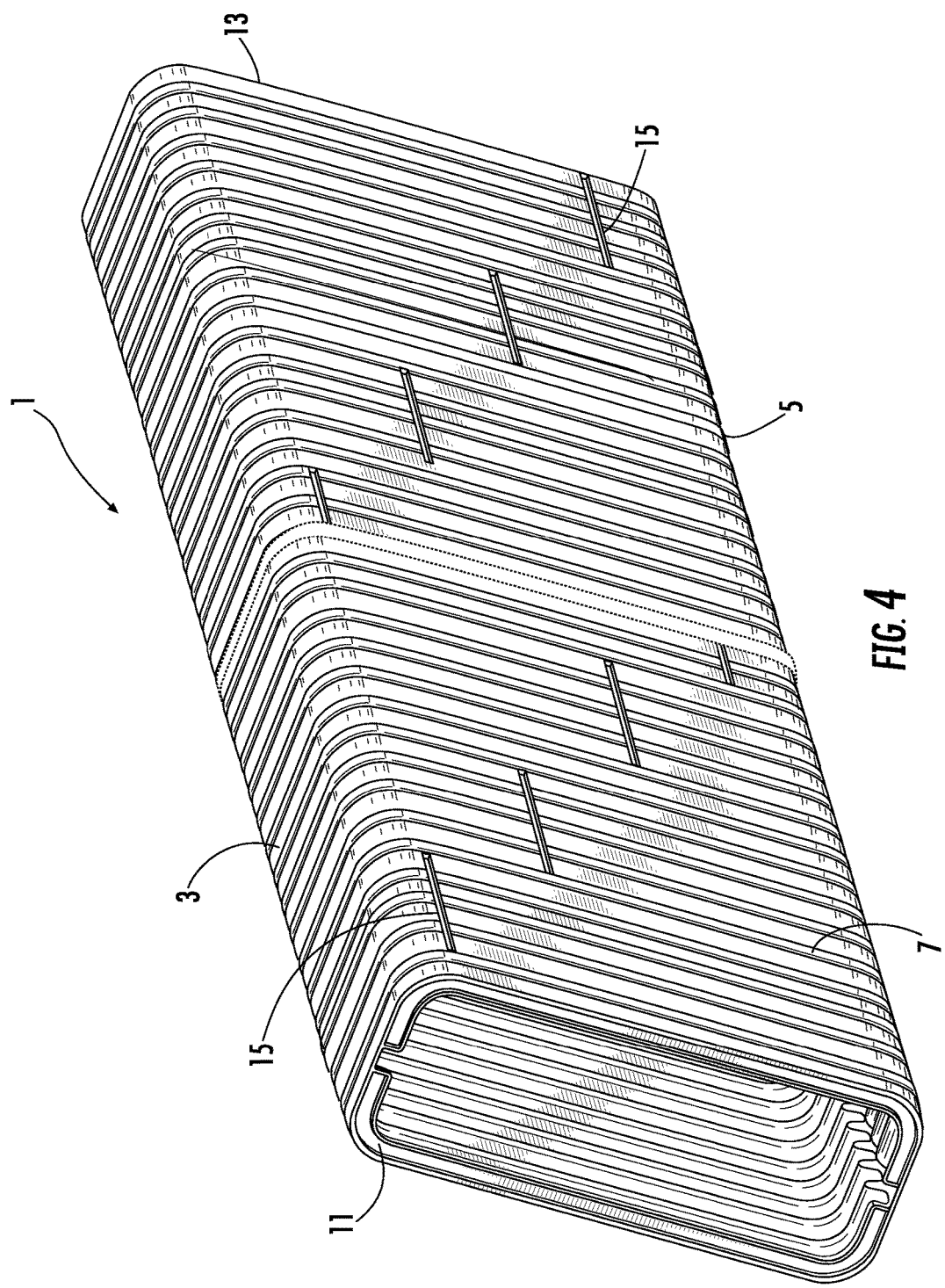
FIG. 4 is a perspective view of a webless corrugated dual wall foundation drain constructed in accordance with the present invention.
Figure 7:
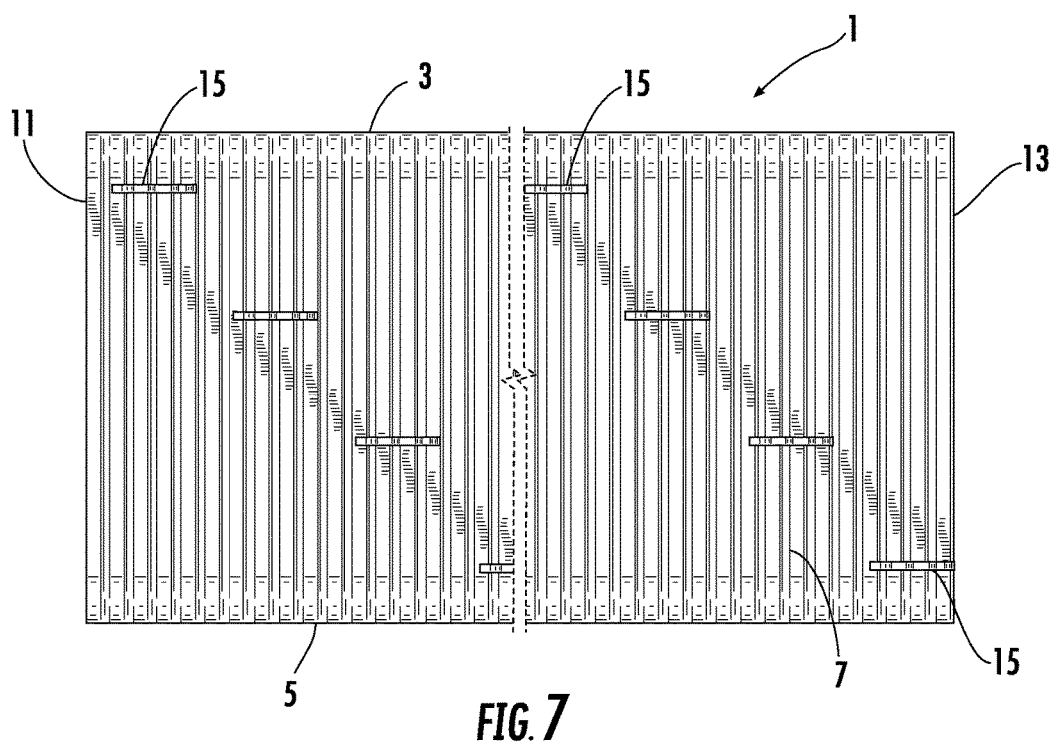
FIG. 7 is a right side elevational view of the webless corrugated dual wall foundation drain depicted in FIG. 4.
Figure 8:
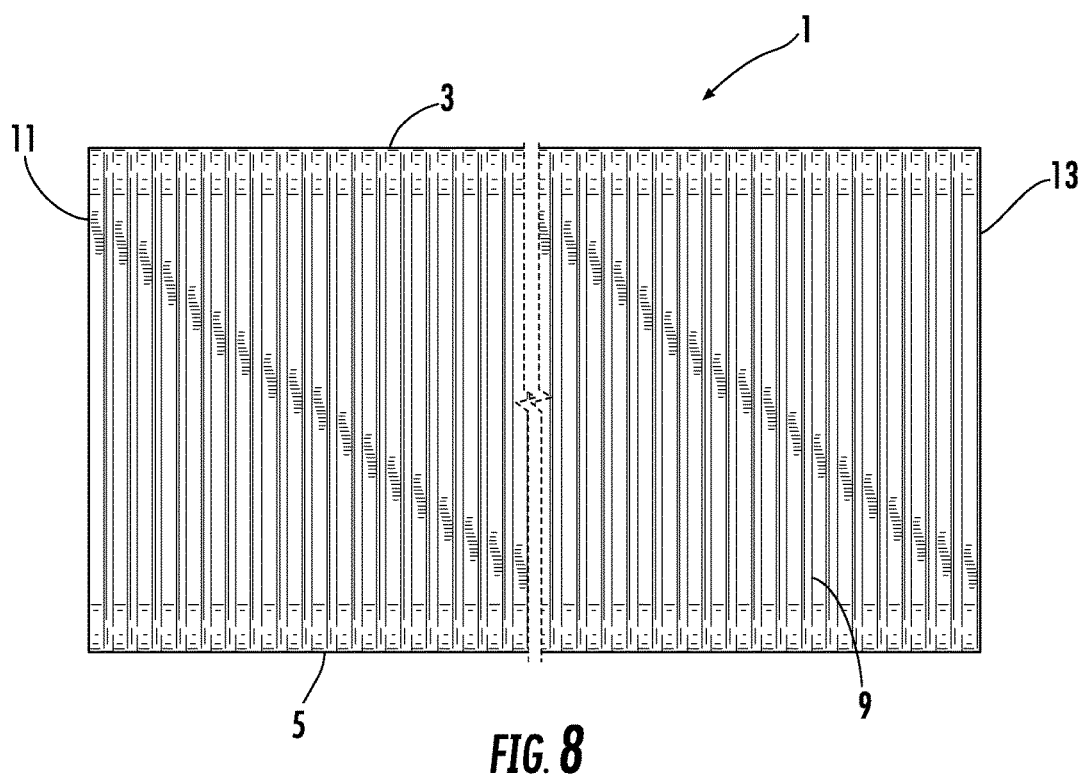
FIG. 8 is a left side elevational view of the webless corrugated dual wall foundation drain depicted in FIG. 4.
Figure 9:
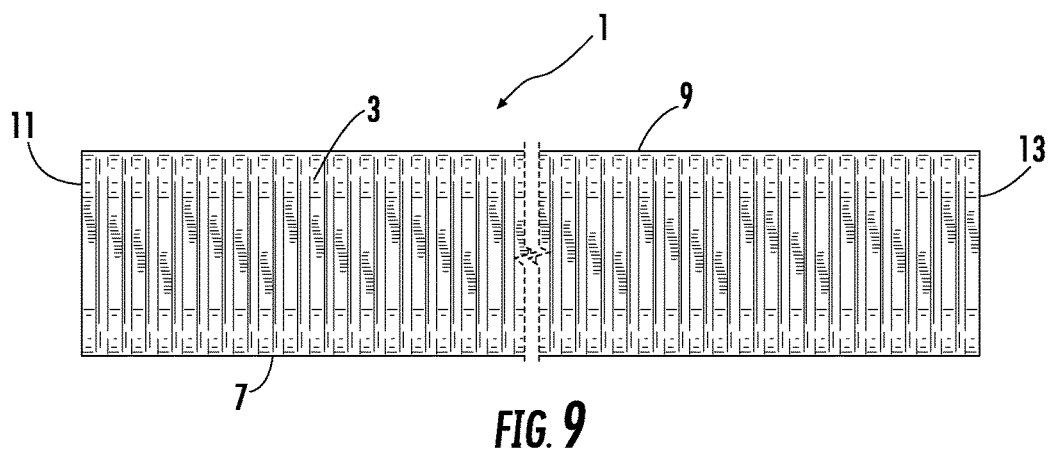
FIG. 9 is a top plan view of the webless corrugated dual wall foundation drain depicted in FIG. 4.
Figure 10:
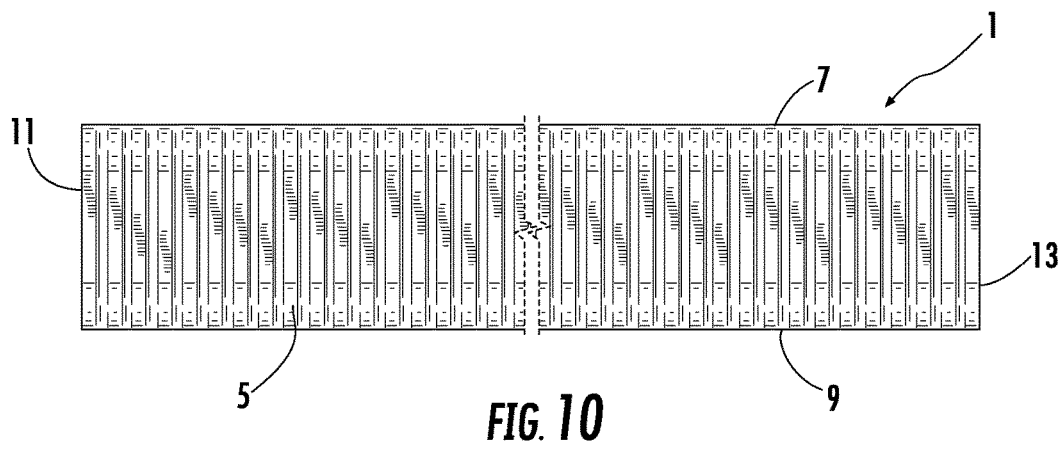
FIG. 10 is a bottom plan view of the webless corrugated dual wall foundation drain depicted in FIG. 4.

As noted previously, the plastic drain segments of traditional foundation drain/form systems are necessarily constructed with an internal transverse web to help support and prevent inward deflection of the drain segments. With the present invention, however, the outer smooth wall 29 greatly increases the strength of the product as a whole so as to resist any such lateral or inward deflection of the pipe. Consequently, as an added benefit of the outer smooth wall 29 in the present invention, the structural integrity of the drain segment 1 as a whole is greatly enhanced, thereby allowing for the elimination of the center web. Therefore, as shown in FIGS. 4-6, in the preferred embodiment of the present invention, the inner corrugated rectangular drain segment 1 is completely hollow, having no web segment extending transversely between sides 7 and 9 thereof. Not only has the beam stiffness of the product been significantly increased, but the need for an inner transverse web typically associated with a conventional HDPE or PVC foundation drain pipe has been eliminated.

Figure 17:
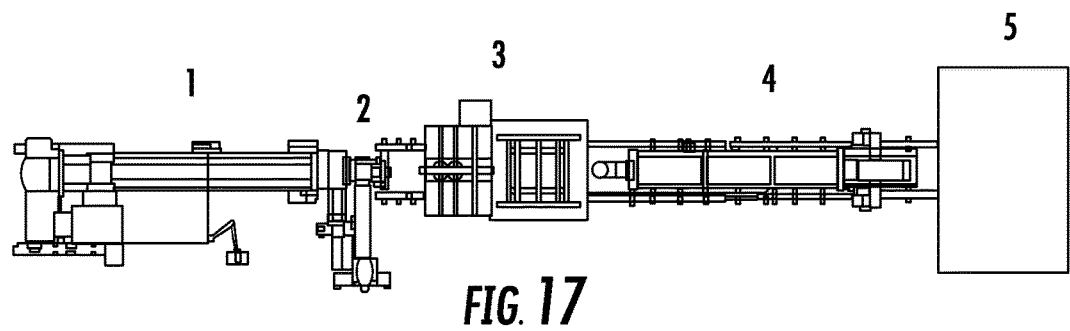
FIG. 17 is a layout plan view showing the typical extrusion process for manufacturing conventional HDPE single wall rectangular corrugated foundation drain pipe.

As noted earlier, manufacturing a webless corrugated dual wall foundation drain 1 in accordance with the present invention is accomplished through a coextrusion process. However, given the rectangular configuration of the foundation drain 1, the manufacturing process to form an outer smooth wall 29 integrally with the rectangular corrugated inner wall 17 has added complexities. As shown in FIG. 17, conventional rectangular corrugated HDPE pipe is manufactured similarly to traditional circular corrugated HDPE pipe, and involves the following five basic steps:
1. An extruder which takes raw HDPE material (in the form of pellets or regrinds) and melt blends the material and feeds the material, under pressure, to a flow tube.
2. The flow tube feeds a rectangular die. The melted HDPE exits the die as a relatively thin melted plastic shell at approximately 400 degrees Fahrenheit.
3. The plastic shell is pulled, by vacuum, into the corrugated aluminum mold blocks of a corrugator. As the formed plastic travels along the length of the corrugator tunnel, the pipe cools and ultimately exits the corrugator at an elevated temperature of more than 250 degrees Fahrenheit.
4. After exiting the corrugator the pipe enters a water bath to further cool the temperature to approximately 80-100 degrees Fahrenheit.
5. Upon exiting the water bath, the pipe enters a perforator where knives or blades cut perforation slits into the pipe.

Figure 18:
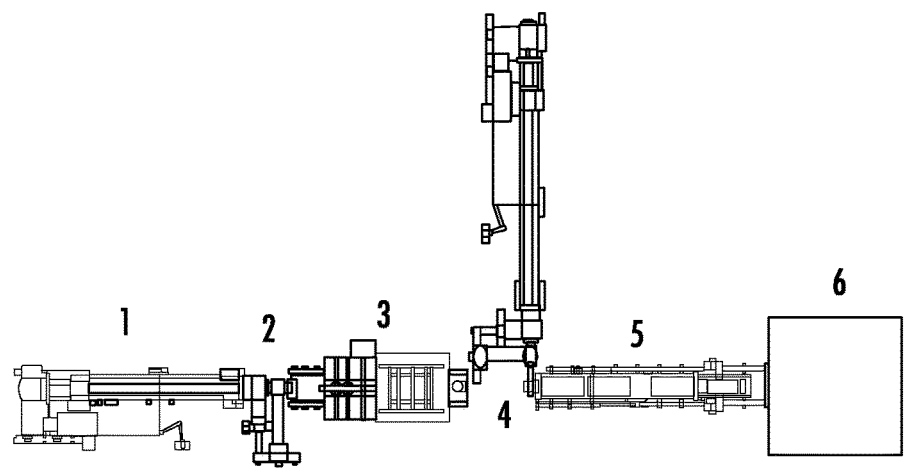
FIG. 18 is a layout plan view showing the coextrusion process for manufacturing webless corrugated dual wall foundation drain in accordance with the present invention, as depicted in FIGS. 4-13.

In order to extrude the outer smooth wall 29 integrally with the rectangular inner corrugated wall 17, a compatible HDPE material is fed into a cross head die using a second extruder after the corrugated inner wall 17 leaves the corrugator. Accordingly, as best shown in FIG. 18, forming a webless corrugated dual wall foundation drain 1 in accordance with the present invention involves the following six basic steps, wherein the most significant differences are noted in steps 4 and 5:
1. An extruder which takes raw HDPE material (in the form of pellets or regrinds) and melt blends the material and feeds the material, under pressure, to a flow tube.
2. The flow tube feeds a rectangular die. The melted HDPE exits the die as a relatively thin melted plastic shell at approximately 400 degrees Fahrenheit.
3. The plastic shell is pulled, by vacuum, into the corrugated aluminum mold blocks of a corrugator. As the formed plastic travels along the length of the corrugator tunnel, the pipe cools and ultimately exits the corrugator at an elevated temperature of more than 250 degrees Fahrenheit.
4. Upon exiting the corrugator, the pipe enters the center of a cross head which is fed by a secondary extruder. The extruder feeds the cross head die with a compatible HDPE material which is extruded over the exterior of the single wall rectangular pipe.
5. Upon exiting the cross head die, the dual wall pipe enters a vacuum sizing tank which also serves as a water cooling bath to further cool the temperature to approximately 80-100 degrees Fahrenheit.
6. Upon exiting the water bath, the pipe enters a perforator where knives or blades cut perforation slits into the pipe.

From the foregoing, it is seen that the HDPE material used in the formation of the outer smooth wall 29 is introduced downstream of the formation of the inner corrugated wall 17, utilizing a secondary extruder to feed a cross head die. With the corrugated pipe still at an elevated temperature upon exiting the corrugator, the outer wall 29 forms integrally with the root section 27 of each valley-defining portion 21 between successive corrugations 19 of the inner wall 17. Accordingly, the smooth exterior layer 29 bridges the inner corrugations 19 and significantly increases the beam stiffness over the length of the drain segment 1.

Figure 19:
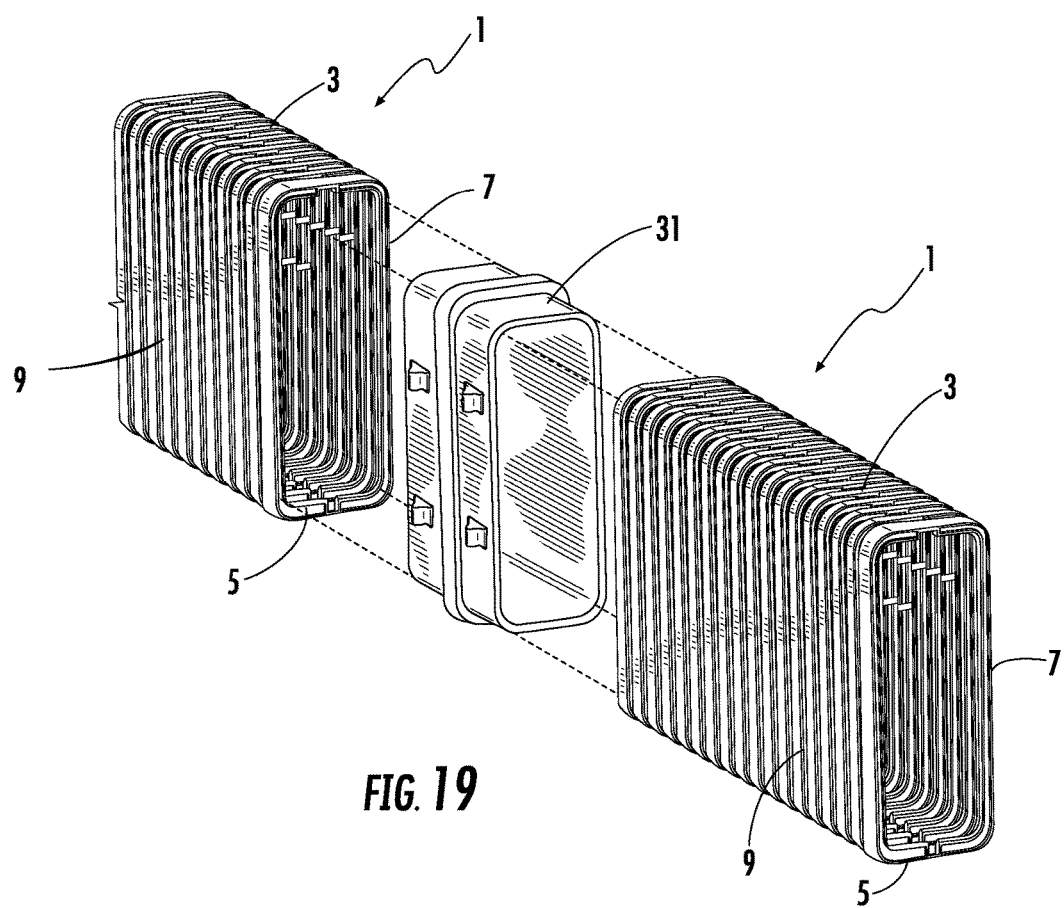
FIG. 19 is an exploded perspective view showing the manner in which webless corrugated dual wall foundation drain constructed in accordance with the present invention are coupled together using internal couplers.

The advancements in the use of plastic HDPE foundation drain systems have provided an innovative, efficient alternative to traditional wood forms. The corrugated HDPE foundation drain system of the present invention actually forms the footings while at the same time providing superior drainage and radon venting. Installation of such a foundation drain system utilizing the drain segments 1 of the present invention is greatly simplified over the use of traditional wood forms. It is contemplated that lineal drains segments 1 in 10' lengths will be suitable for use by installation contractors, but other lengths may also be acceptable. Cutting the drain segments 1 to the required lengths can be easily done using a hand saw, circular saw or reciprocating saw. Internal couplers 31 similar to that shown in FIG. 19 for connecting adjacent drain sections 1 are available (i.e., straight couplers, elbows, etc.), so any remaining section of cut pipe may be used as part of the next section, thus minimizing material waste.

Once the foundation system layout is complete and the drain segments 1 are coupled together in their desired configuration, a series of spacer straps and pin stakes similar to that shown in FIG. 2 may be installed to ensure proper footing width and desired elevation level of the drain segments. Pinning of the drain segments 1 can be accomplished by securing the segments with screws or nails to steel forming pins, grade stakes or wood stakes. Such pinning of the drain segments 1 should preferably be done approximately every 3'-5' along the laterals as well as at any elbows or points of connection. The spacer straps can be left in place to be used as rebar chairs or can be removed as the concrete is poured.

Figure 20:
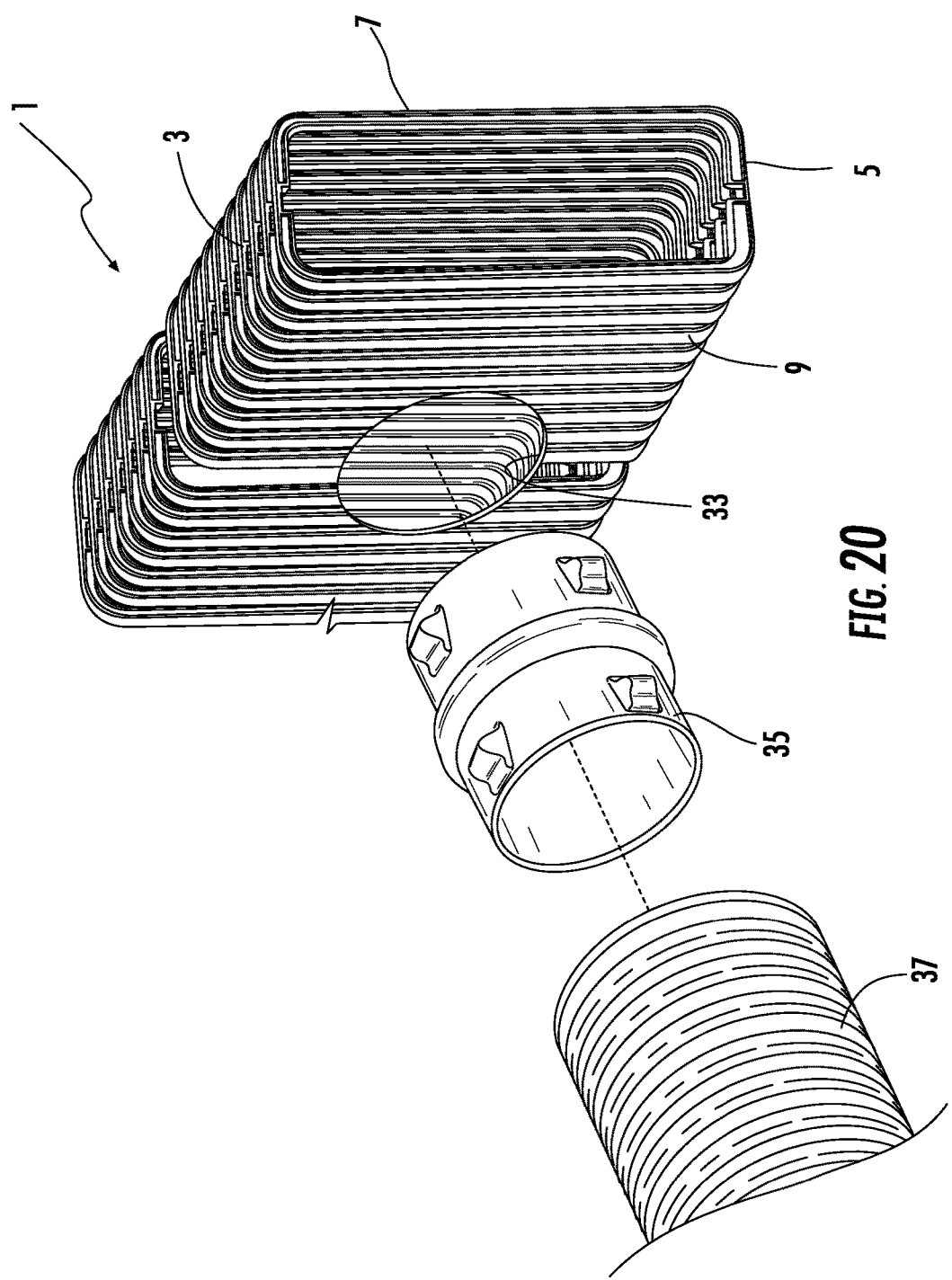
FIG. 20 is an exploded perspective view showing the formation and assembly of a drainage outlet using the webless corrugated dual wall foundation drain constructed in accordance with the present invention.

Drainage outlets from such foundation systems are also needed to direct the flow of water either to a sump pit or away from the footing. With reference to FIG. 20, it can be seen that drainage outlets, crossovers and the like may be located at any point along a foundation drain system using the webless corrugated dual wall foundation drains 1 constructed in accordance with the present invention. By simply cutting an opening 33 near the bottom of a drain segment 1, adaptor couplings 35 for conventional drain pipe 37 can be used to make the connections to form the necessary drainage outlets or crossovers.

Figure 21:
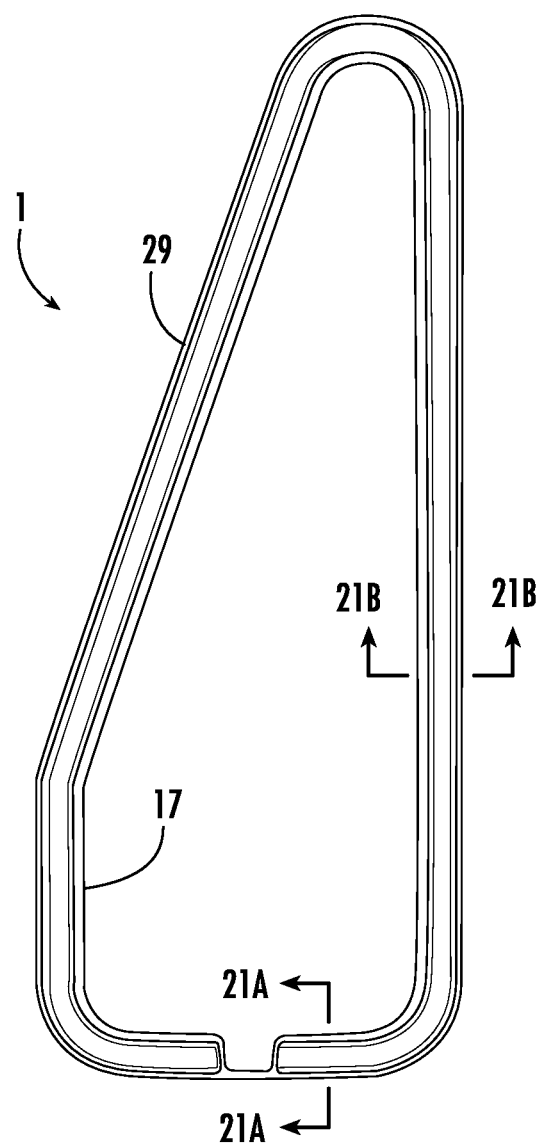
FIG. 21 is a front elevational view of another embodiment of a webless corrugated dual wall foundation drain pipe having a generally trapezoidal cross-sectional configuration.
Figure 21A:
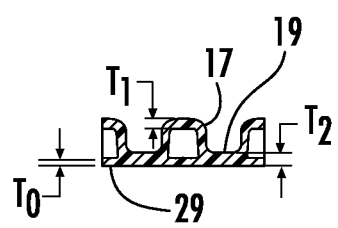
FIG. 21A is a cross-sectional view of the top and bottom portions of the section of dual wall foundation drain pipe shown in FIG. 21, disclosing the relative wall thickness of the foundation drain pipe in this area.
Figure 21B:
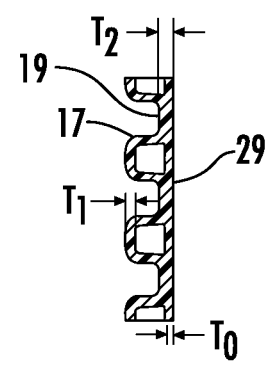
FIG. 21B is a cross-sectional view of the side portions of the section of dual wall foundation drain pipe shown in FIG. 21, disclosing the relative wall thickness of the foundation drain pipe in this area.

As noted above, other polygonal cross-sectional configurations of the drain segment 1 are also contemplated, such as that shown in FIGS. 21 (trapezoidal) and 22 (triangular). In the associated cross-sectional views of FIGS. 21A, 21B and 22A, 22B, respectively, it can similarly be seen that the thickness $T_O$ of the outer wall 29 on all sides of drain segment 1 is less than that of the thickness $T_1$ of inner wall 17. Also, with any of the above configurations, the combined inner and outer wall thickness at point $T_2$ bridging the root section 27 of valley-defining portion 19 between adjacent inner wall corrugations 19 is thicker than the wall segments at either points $T_O$ or $T_1$.

With the present invention, an improved foundation drain is provided that includes all the advantageous benefits of impact resistance provided by the flexible nature of HDPE pipe, yet exhibits the longitudinal beam stiffness akin to the PVC pipe and conventional lumber forms. With the use of the preferred webless dual wall corrugated foundation drain described herein, the beam stiffness and structural integrity of the installed drain segments 1 will be significantly enhanced, thereby eliminating problems of vertical sagging commonly associated with prior art HDPE foundation drain systems.

The disclosure herein is intended to be merely exemplary in nature and, thus, variations that do not depart from the gist of the disclosure are intended to be within the scope of the disclosure. Such variations are not to be regarded as a departure from the spirit and scope of the disclosure.

What is claimed is:

1. A dual wall foundation drain, comprising:
   a section of hollow tubular pipe having a generally non-square polygonal cross-sectional configuration;
   said tubular pipe having a corrugated inner wall formed of a flexible plastic material which is defined by spaced apart successive circumferentially extending radially inward protruding peaks with circumferentially extending valley-defining portions deposed therebetween;
   said tubular pipe having a substantially smooth exterior wall formed of a relatively flexible plastic material which extends around said inner corrugated wall and is integrally formed therewith; and
   said tubular pipe having sufficient vertical beam strength to support its own weight over 60 inches of length for at least one minute without deflection.

2. The dual wall foundation drain set forth in claim 1, wherein said hollow tubular pipe is generally rectangular in cross section with opposing wall sections, said pipe being devoid of any supporting structure extending between said opposing wall sections.

3. The dual wall foundation drain set forth in claim 1, wherein said exterior wall is integrally formed with a root portion of each of said successive valley-defining portions of said corrugated inner wall.

4. The dual wall foundation drain set forth in claim 1, wherein the thickness of said exterior wall is approximately 10-45 percent of the thickness of said inner corrugated wall.

5. The dual wall foundation drain set forth in claim 1, wherein said hollow tubular pipe is generally rectangular in cross section.

6. The dual wall foundation drain set forth in claim 1, wherein said hollow tubular pipe is generally trapezoidal in cross section.

7. The dual wall foundation drain set forth in claim 1, wherein said hollow tubular pipe is generally triangular in cross section.

8. A dual wall foundation drain, comprising:
   a section of hollow tubular pipe having a generally rectangular cross-sectional configuration with shorter upper and lower wall sections and wider opposing side wall sections;
   said tubular pipe having a corrugated inner wall formed of high density polyethylene which is defined by spaced apart successive circumferentially extending radially inward protruding peaks with circumferentially extending valley-defining portions deposed therebetween;
   said tubular pipe having a substantially smooth exterior wall formed of high density polyethylene which extends around said inner corrugated wall and is integrally formed therewith; and
   said tubular pipe requiring a load of greater than 100 pounds upon said upper wall section to cause vertical deflection of at least 0.35 inches.

9. A dual wall foundation drain, comprising:
   a section of hollow tubular pipe having a generally rectangular cross-sectional configuration with shorter upper and lower wall sections and wider opposing side wall sections;
   said tubular pipe having a corrugated inner wall formed of high density polyethylene which is defined by spaced apart successive circumferentially extending radially inward protruding peaks with circumferentially extending valley-defining portions deposed therebetween;
   said tubular pipe having a substantially smooth exterior wall formed of high density polyethylene which extends around said inner corrugated wall and is integrally formed therewith; and
   said tubular pipe requiring a load of greater than 200 pounds upon said upper wall section to cause vertical deflection of at least 0.875 inches.

10. A dual wall foundation drain, comprising:
    a section of hollow tubular pipe having a generally rectangular cross-sectional configuration with shorter upper and lower wall sections and wider opposing side wall sections;
    said tubular pipe having a corrugated inner wall formed of high density polyethylene which is defined by spaced apart successive circumferentially extending radially inward protruding peaks with circumferentially extending valley-defining portions deposed therebetween;
    said tubular pipe having a substantially smooth exterior wall formed of high density polyethylene which extends around said inner corrugated wall and is integrally formed therewith; and
    said tubular pipe having sufficient vertical beam strength to support its own weight over 60 inches of length for at least one minute without deflection.

11. A dual wall foundation drain, comprising:
    a section of hollow tubular pipe having a generally non-square polygonal cross-sectional configuration;
    said tubular pipe having a corrugated inner wall formed of a flexible plastic material which is defined by spaced apart successive circumferentially extending radially inward protruding peaks with circumferentially extending valley-defining portions deposed therebetween;
    said tubular pipe having a substantially smooth exterior wall formed of a relatively flexible plastic material which extends around said inner corrugated wall and is integrally formed therewith; and said tubular pipe requiring a load of greater than 100 pounds upon said upper wall section to cause vertical deflection of at least 0.35 inches.

12. The dual wall foundation drain set forth in claim 11, wherein said hollow tubular pipe is generally rectangular in cross section.

13. A dual wall foundation drain, comprising:
a section of hollow tubular pipe having a generally non-square polygonal cross-sectional configuration;
said tubular pipe having a corrugated inner wall formed of a flexible plastic material which is defined by spaced apart successive circumferentially extending radially inward protruding peaks with circumferentially extending valley-defining portions deposed therebetween;
said tubular pipe having a substantially smooth exterior wall formed of a relatively flexible plastic material which extends around said inner corrugated wall and is integrally formed therewith; and
said tubular pipe requiring a load of greater than 200 pounds upon said upper wall section to cause vertical deflection of at least 0.875 inches.

14. The dual wall foundation drain set forth in claim 13, wherein said hollow tubular pipe is generally rectangular in cross section.

\* \* \* \* \*